Figure 1:
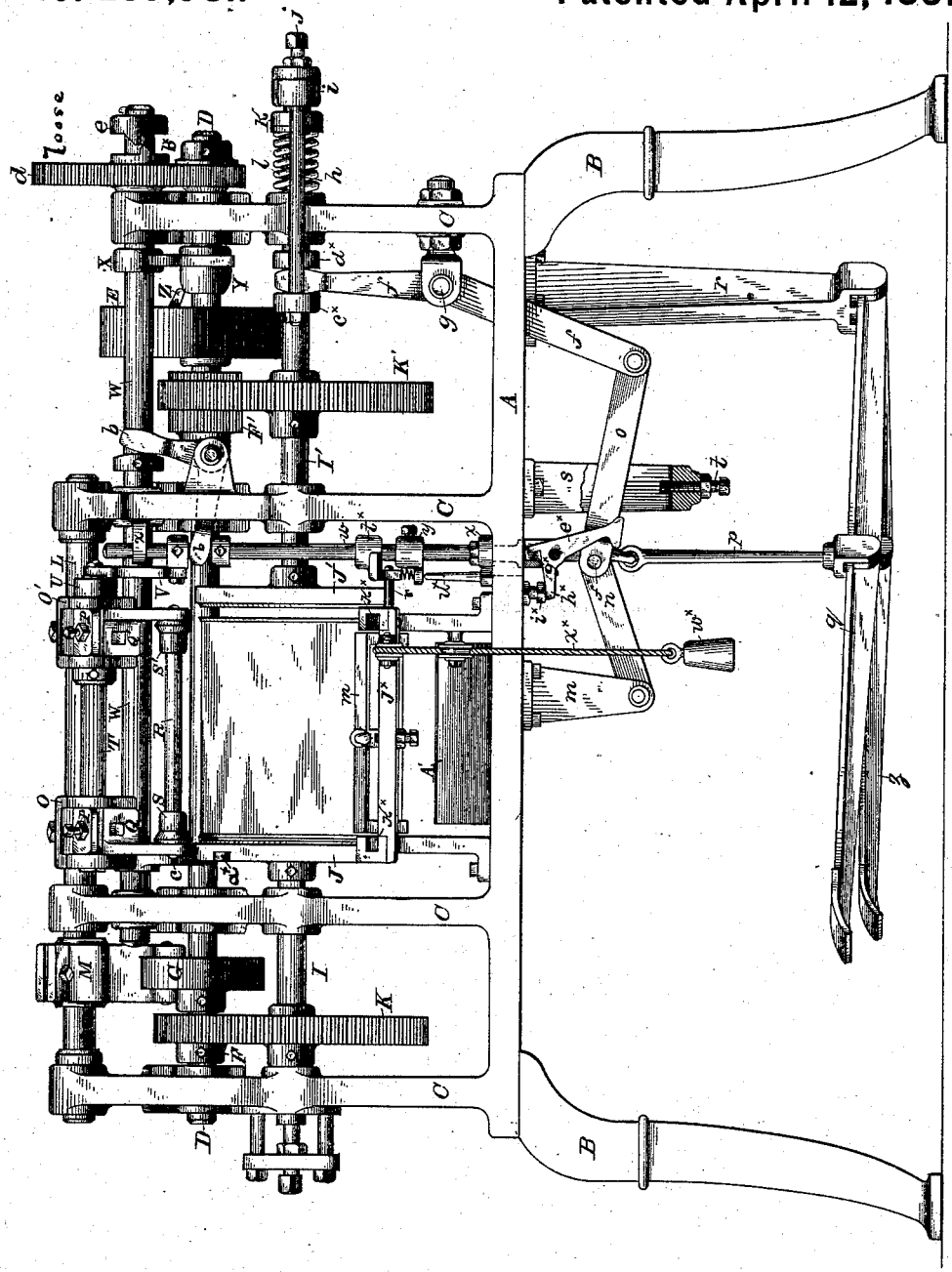

(No Model.) 6 Sheets—Sheet 3.

G. H. PERKINS.
Rotary Machine for Closing the Seams of Sheet Metal Cans.

No. 239,981. Patented April 12, 1881.

Attests:
J. H. Templin.

Inventor:
George H. Perkins
By his Attorneys
W. C. Strawbridge,
J. Bonsall Taylor (No Model.) 6 Sheets—Sheet 4.

G. H. PERKINS.
Rotary Machine for Closing the Seams of Sheet Metal Cans.

No. 239,981. Patented April 12, 1881.

Attests:
J. H. Templin.

George H. Perkins
Inventor
By his Attorneys (No Model.) 6 Sheets—Sheet 5.
G. H. PERKINS.
Rotary Machine for Closing the Seams of Sheet Metal Cans.
No. 239,981. Patented April 12, 1881.
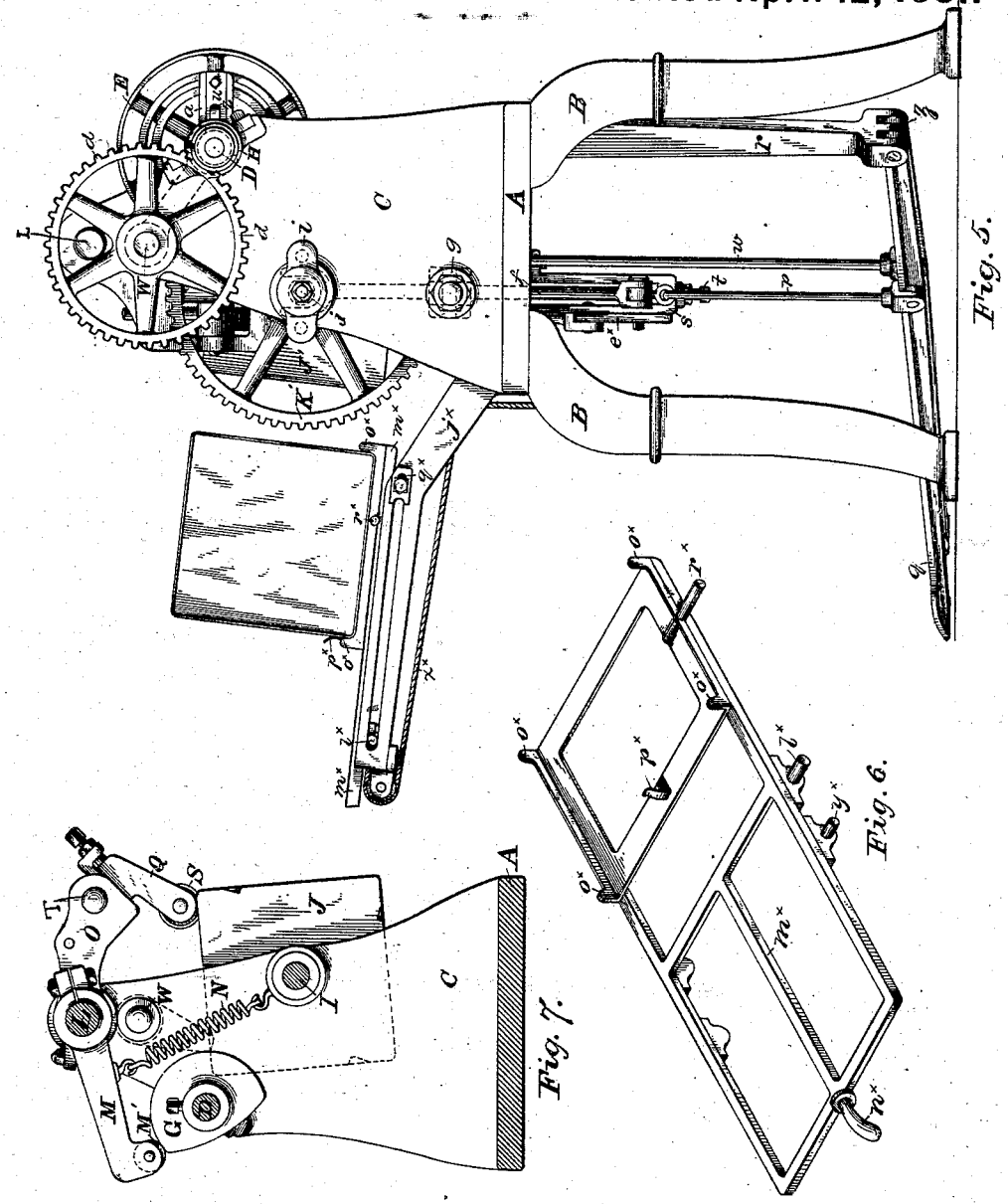
Attests:
J. H. Templin.
Inventor.
George H. Perkins
By his Attorneys
W. C. Strawbridge,
Bonsall Taylor.

UNITED STATES PATENT OFFICE.

GEORGE H. PERKINS, OF PHILADELPHIA, PENNSYLVANIA.

ROTARY MACHINE FOR CLOSING THE SEAMS OF SHEET-METAL CANS.

SPECIFICATION forming part of Letters Patent No. 239,981, dated April 12, 1881.

Application filed December 11, 1880. (No model.)

*To all whom it may concern:*

Be it known that I, GEORGE H. PERKINS, of the city and county of Philadelphia, and State of Pennsylvania, have invented an Improvement in Rotary Machines for Closing the Seams of Sheet-Metal Cans, of which the following is a specification.

My invention relates in general to the class of mechanisms employed to secure the heads upon the bodies of sheet-metal cans, and relates more specifically to that subdivision of such class which employs rollers caused to bear against the seams to be closed while the can is rotated against the rollers, as opposed to that class in which sliding jaws are brought up against the seams, the can remaining fixed; and it is an improvement upon the apparatus invented by Edmund Jordon, (application for patent for which was filed in the United States Patent Office on the 4th day of November, 1880,) which is a rotary device for seaming the heads upon quadrangular, square, hexagonal, or other shaped cans having approximately angular corners, and neither circular nor oval in cross-section, in which seaming-rolls are caused to travel in close contact with the head-seams of the can, of whatever exterior contour the same may be, so that in the seaming, for instance, of quadrangular cans the rolls will not only travel around the right-angular corners in contact with the seam, but will remain in contact with the straight sides throughout the entire revolution of the can as the latter is revolved against the rolls. The Jordon apparatus stands vertically and the cans are fed to it by hand.

In my present improvement the operative mechanism is placed in a horizontal position, and an automatic feed is provided which feeds the cans direct between the head-plates in proper position to be clamped thereby and to be acted upon by the seaming-rolls, and which is operated automatically, after the feeding of a can, to recede and assume position to take a second can, the machine being started independently of the feed by the action of a starting-treadle, but stopping itself automatically with the parts in condition to receive the second can.

The invention consists in the apparatus hereinafter described and claimed.

Figure 2:
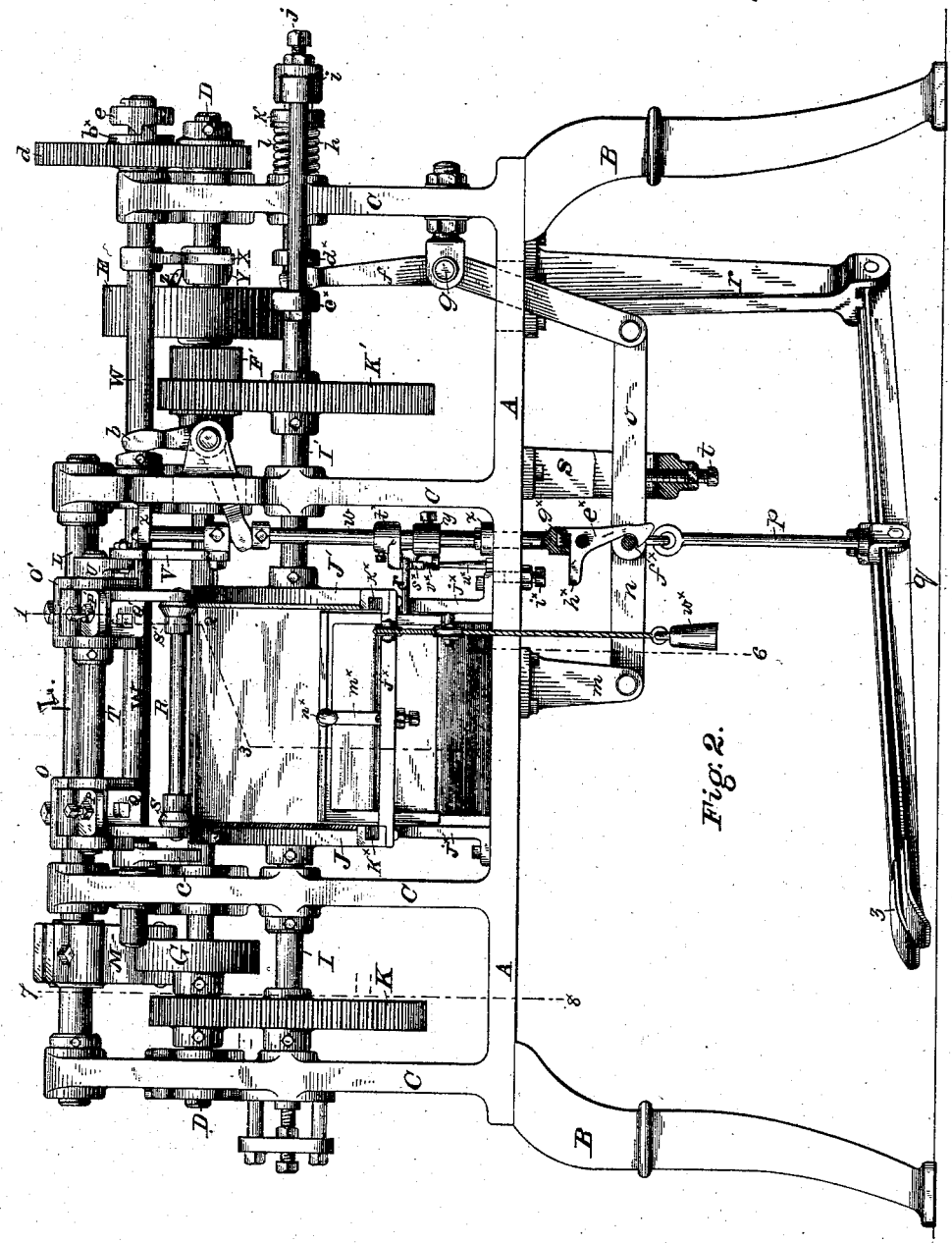
Figure 3:
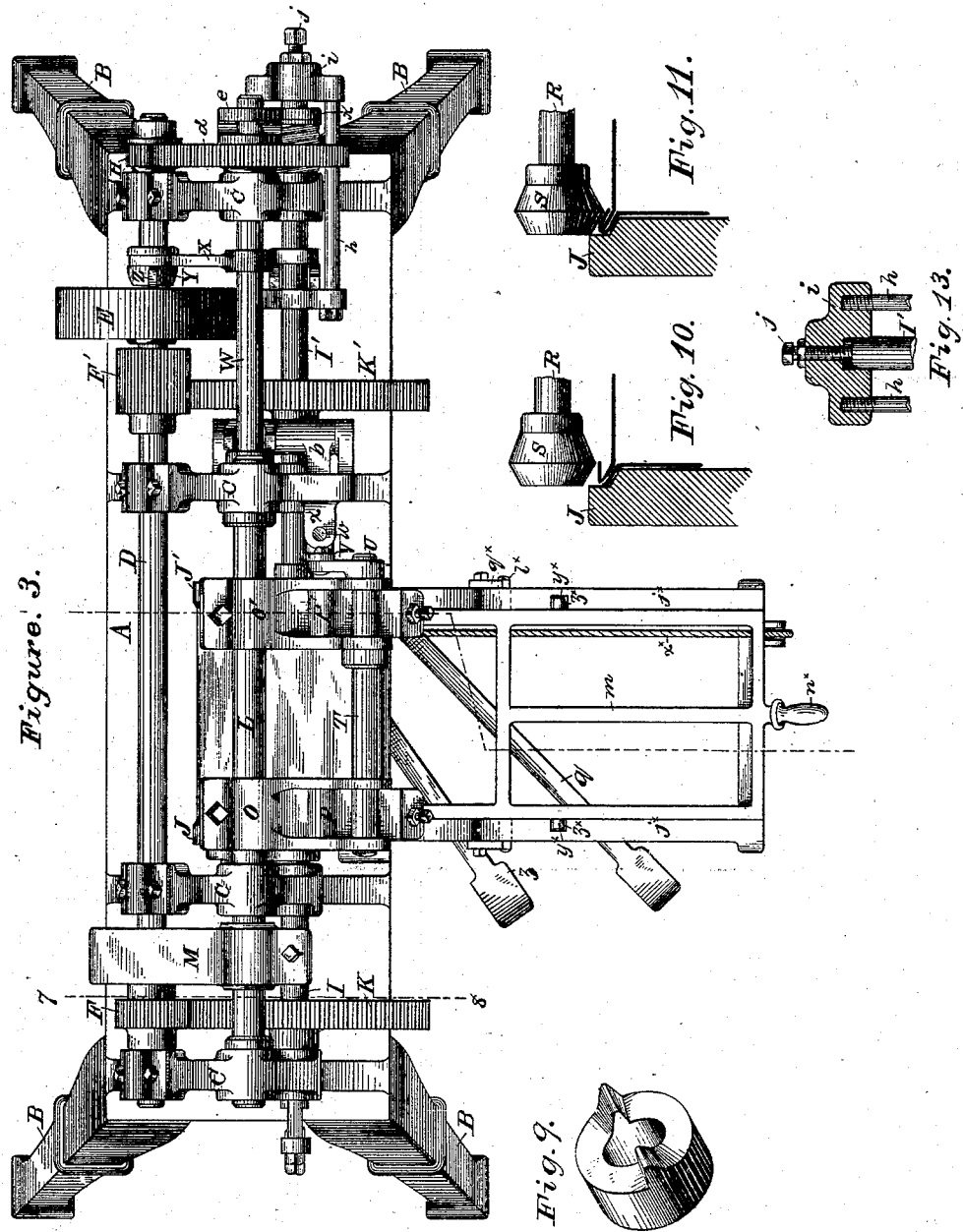
Figures 4, 8, 14, 15:
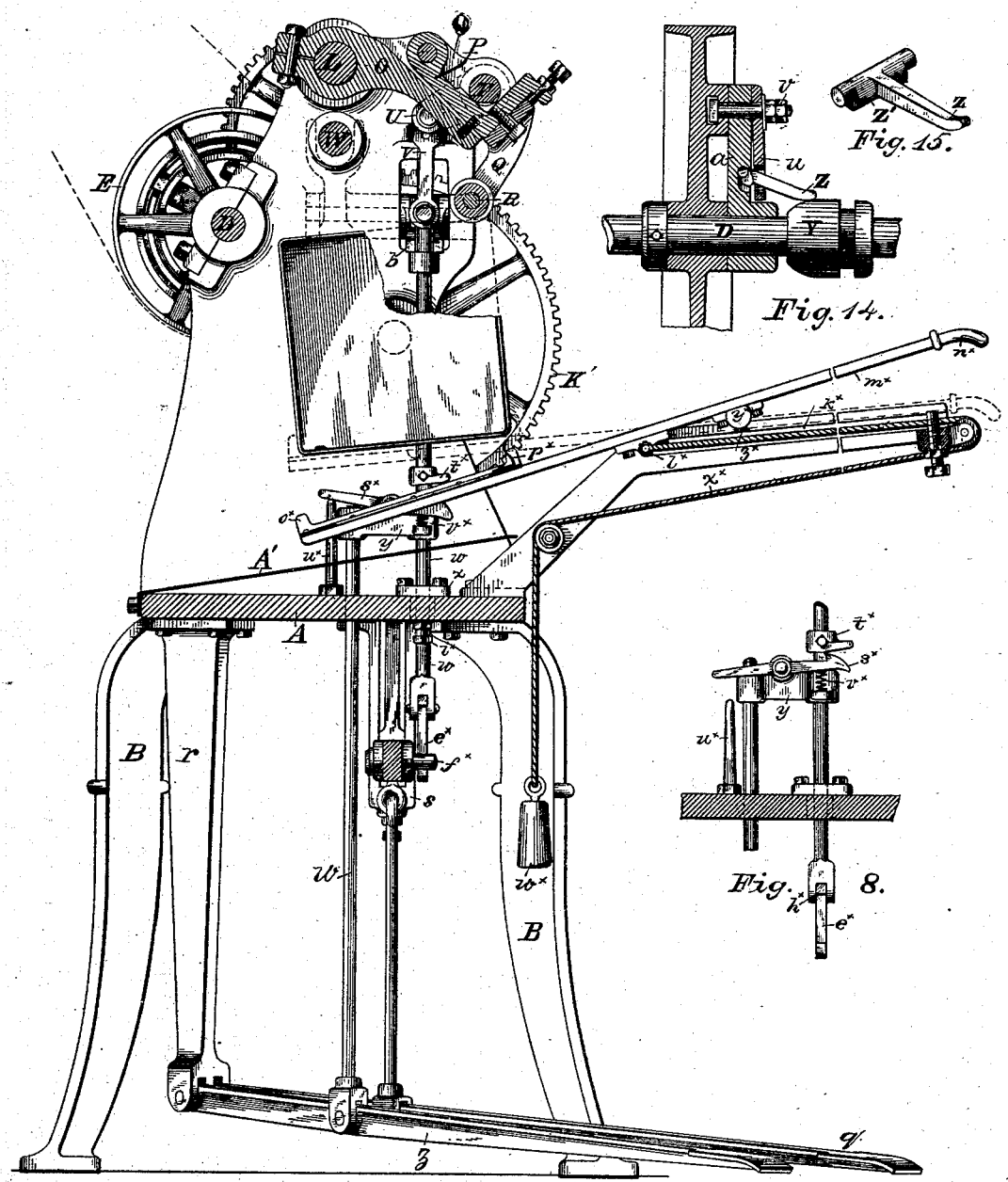
Figure 12:
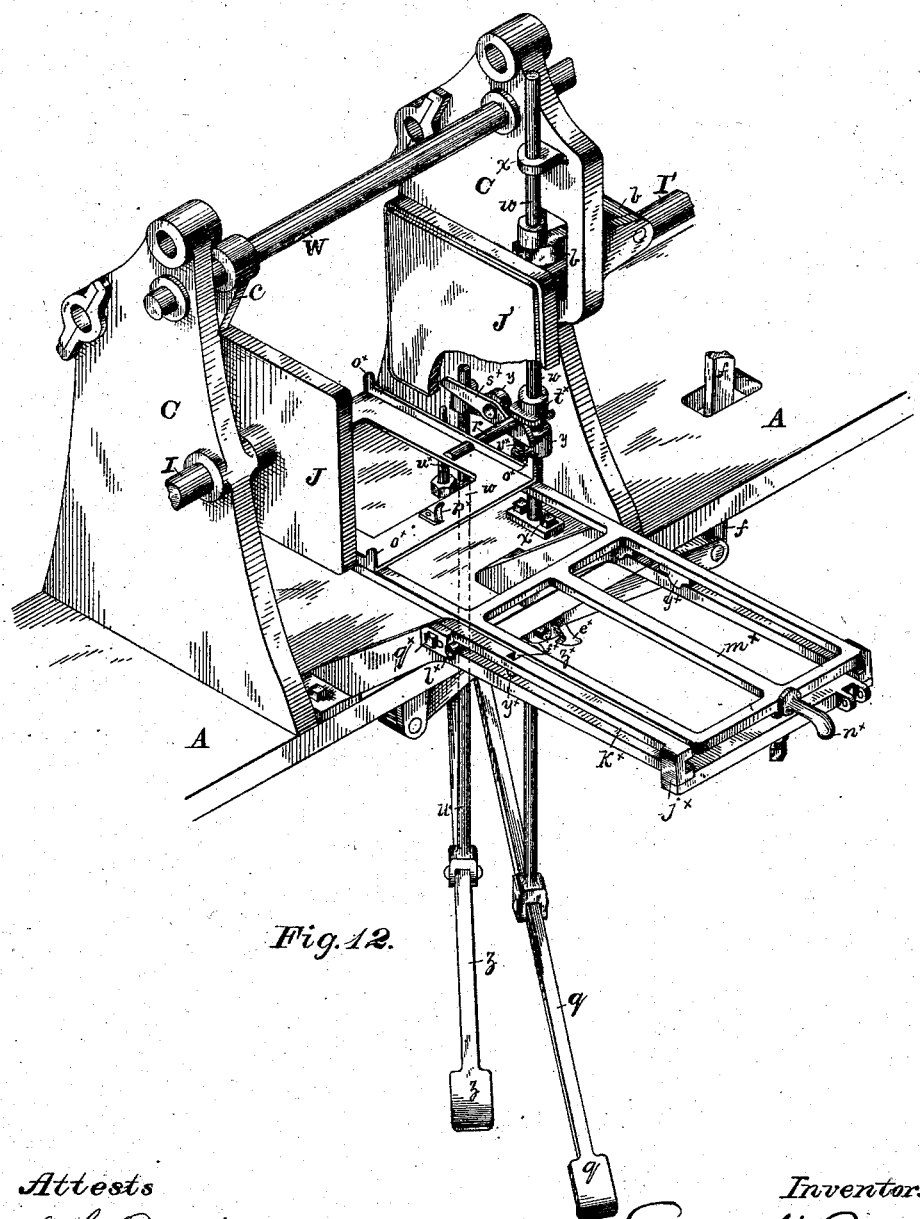

In the accompanying drawings, Figure 1 is a front elevation of an apparatus conveniently embodying my invention with a can fed in place between the head-plates, but not clamped thereby, the driving-pulley not made fast, and the machine at rest. Fig. 2 is a similar view of the same, the can being clamped between the head-plates, the driving-pulley made fast, and all the parts in the position they occupy during the rotation of the machine. Fig. 3 is a top-plan view of the apparatus of Fig. 2; Fig. 4, a sectional side elevation on the line 1, 2, 3, and 4 of Fig. 2, looking from the left hand of said figure; Fig. 5, an end elevation of Fig. 2 viewed from the right-hand side of said figure, an extra can being represented in place upon the feed-frame; Fig. 6, a perspective view of the sliding feed-frame; Fig. 7, a side sectional elevational detail of the rock-shaft, rock-shaft arm, roller rock-shaft arm, and cam on the line 5 6 of Fig. 2, viewed from the left-hand side; Fig. 8, a side elevational detail of the sliding feed-frame lock, the yoke of the starting-rod, and the parts in connection therewith; Fig. 9, a perspective detail of the releasing-ratchet; Figs. 10 and 11, side sectional details of one of the seaming-rolls in the position it occupies before and after its tightening up against the seam to be closed; Fig. 12, a perspective view of the sliding feed-frame lock, the starting-rod, head-plates, toggle-bars, disk-stop, toggle-release, and the parts connected therewith in the position such parts occupy when the disks are apart and not clamped upon the can. Fig. 13 is a top sectional plan of the cross-head *i*; Fig. 14, a side sectional elevation of the driving-pulley and clutch in action, and Fig. 15 a view in perspective of the eccentric-lever of the clutch.

Similar letters of reference indicate corresponding parts.

In the accompanying drawings, A is a horizontal frame-work erected upon legs B or other suitable support. From the frame-work arise vertical bearing-plates C, in which the operative portions of the apparatus are suitably journaled, or to which they are, by proper brackets, attachments, or bearings, suitably connected.

D is the driving-shaft, journaled in all of the bearing-plates. Upon the driving-shaft are mounted, first, a driving-pulley, E, adapted by a suitable clutch device, Fig. 14, to be made tight or loose thereon; second, two pinions, F F', from which motion is communicated to two spur-wheels, K K', which are mounted on and impart rotation to the shafts of the can-clamping disks, one of the pinions, F', being of greater width than the other, to enable the sliding of the spur-wheel K', which gears with it, from side to side within its leaves without ungearing; third, a cam, G, Fig. 7, from which motion is imparted to the rock-shaft arm for the oscillation of the rock-shaft; and, fourth, a small pinion, H, Figs. 3 and 5, which gears with a spur-wheel, d, upon the shifter-shaft, whereof hereinafter.

I I' are head-plate shafts, journaled, as shown, in the bearing-plates, and both equipped upon their inner extremities, which face each other, with head-plates J J', Figs. 1 and 12, which latter are conformed to the outline of the head of the can to be closed, and adapted when clamped together to retain, and when rotated to rotate, the can.

K K' are spur-wheels, mounted upon the head-plate shafts I I' and meshing with the pinions F F', as before stated. By the rotation of the driving-shaft through the medium of these pinions and spur-wheels the head-plates, it will be seen, are rotated in such manner as to rotate a can clamped between them.

L is a rock-shaft, Figs. 1, 4, and 7, journaled in the upper portions of the three left-hand bearing-plates and free to oscillate.

M is a rock-shaft arm, Figs. 3, 4, and 7, secured to the rock-shaft and extending rearwardly therefrom. Its rear extremity is equipped with an anti-friction roll, M', which bears against the cam G, being held in contact therewith by the coiled spring N, and takes its movement therefrom. The cam, being upon the driving-shaft D, as described, and revolving with it, causes the oscillation of the rock-shaft L upon every revolution of the driving-shaft.

O O' are roller rock-shaft arms, Figs. 4 and 7, secured upon the rock-shaft and extending forward therefrom. They are equipped with hinged brackets P P', which carry projecting arms Q Q', between the downwardly-extending extremities of which is journaled the roll-shaft R, Figs. 1 and 4, which is provided on both ends with seaming-rolls S S'.

The above-described arrangement is the invention of Edmund Jordon, and is set forth in detail in his application for patent hereinbefore referred to. Any further description of these parts is regarded as redundant here, it being considered as sufficient to state that the motion imparted to the rock-shaft from the cam, which is of the proper conformation, is transmitted through the roller rock-shaft arm and attachments to the seaming-rolls, so that the latter are caused to conform in their movement to the movement of the can, and to remain in close contact with its seams throughout the revolution of the can, of whatever shape the cam may be.

T is an eccentric-shaft, Figs. 3 and 4, journaled in the roller rock-shaft arms, and adapted upon its rotation to bring the seaming-rolls into close conjunction with the seams to be acted upon, as also invented by Jordon, and described by him as brought into action by a hand-lever or the like. In my invention this eccentric-shaft is brought into action automatically to tighten up the rolls by means of a crank, U, Figs. 2, 3, and 4, connected with said shaft, and a link, V, connected with said crank and attached to the starting rod—that is to say, as the machine is started the eccentric-shaft is rotated by the starting mechanism and the seaming-rolls tightened up.

W is a shifter-shaft, Figs. 1, 2, 3, and 4, journaled in the three right-hand bearing-plates of the frame-work, in line below the rock-shaft. This shaft is arranged to slide endwise within a given range of play, and its operation is primarily, when thrown from the position of Fig. 1 into that of Fig. 2, to throw the clutch device into gear with the driving-pulley, which latter, before the action of the clutch, ran free upon the driving-shaft, and thereby to cause the rotation of the head-plates; and, secondarily, when thrown from the position of Fig. 2 into that of Fig. 1, to release said clutch and cause the driving-pulley again to run free upon the driving-shaft, thereby ending the revolution of the latter, causing the stoppage of the head-plates in a position in which they are adapted to receive the cans as fed between them, and by causing the crooking of the toggle (whereof hereinafter) occasioning the unclamping of the can. In the position shown in Fig. 1 the shifter-shaft is represented as thrown to the right and the head-plates apart and in readiness to be clamped upon a can shown fed between them. In Fig. 2 the same parts are shown in the position they occupy when the shifter-shaft is thrown to the left and the can is clamped.

X is a depending forked arm, Figs. 1 and 3, angling backwardly and downwardly from the shifter-shaft and straddling a cone, Y, Fig. 14, sliding freely upon the driving-shaft. This cone is adapted to engage beneath the lever Z of a clutch-eccentric, Z', substantially of the form shown in detail in Figs. 14 and 15, upon its movement to the left hand of the driving-shaft, thereby throwing up the lever Z, and by means of the plate-lever u wedging the plate a and rotating bolt v, both of which rotate continuously with the shaft into close frictional contact with the pulley in a manner incident to the construction of this well-known form of clutch.

b is a bell-crank, Figs. 1, 2, 3, 4, and 12, pivoted in ears projecting sidewise from one of the bearing-plates, and bifurcated at both extremities, so as to straddle both the shifter-shaft and the starting-rod.

w is the starting-rod, Figs. 1, 2, 4, 8, and 12, journaled vertically in slide-bearings x x, (well shown in Fig. 12,) provided with a yoke, y, Fig. 8, so as to throw it out of axial alignment, and thence continuing down to the starting-treadle $z$.

It is obvious that when the horizontal arm of the bell-crank $b$, which straddles the starting-rod, is drawn down by the latter the vertical arm of said crank is thrown to the left hand, and the shifter-shaft thereby thrown from right to left—that is, from the position of Fig. 1 to that of Fig. 2. In so doing the clutch is made fast, and the disk-stop $c$, Figs. 2, 7, and 12, which is keyed on the shifter-shaft, and arranged, upon the stoppage of the machine, to engage in a stop-notch, $a^\times$, in the disk $J$, is slid to the left out of the notch, so as to release the head-plate and permit its rotation. Such is the action of the machine in starting.

The following is the device by which the clutch is thrown out of gear in stopping.

$d$ is a toothed wheel on the shifter-shaft, whose circumference is proportionate to that of the pinion $H$ on the driving-shaft. This toothed wheel rotates freely upon the shifter-shaft, but is provided upon its right-hand face with a ratchet-plate, $b^\times$, as well shown in Figs. 1 and 2, which engages against a releasing-ratchet, $e$, keyed upon the extremity of the shifter-shaft. After a given number of revolutions of the driving-shaft the teeth of the ratchet-plate on the wheel $d$ are revolved so as to encounter the teeth on the releasing-ratchet $e$, whereby a movement of the shifter-shaft to the right hand is occasioned by reason of and to the extent which the lift of the opposing teeth in passing over each other occasions, whereby the cone is moved to the right hand, so as to release the clutch, the vertical arm of the bell-crank $b$ moved to the right hand, so as to raise the starting-rod, and the stop $c$ also moved to the right hand and into its notch $a^\times$ in the head-plate, so as to stop the head-plate at a positive point. In other words, all the parts mentioned are moved from the position represented in Fig. 2 to that represented in Fig. 1. It is therefore clear that the device is simply a stopping device, whose action is to throw the machine out of operation, the head-plates out of clamp, as hereinafter explained, and to cause the engagement of the stop $c$ within its notch in the head-plate $J$, and the consequent stopping of the head-plates in proper position to receive the next can.

The can is clamped by the following means: The head-plate shaft $I'$, or shaft which carries the movable head-plate $J'$, is adapted to be moved endwise by the toggle-lever $f$, pivoted at $g$, as shown. The object of moving this shaft endwise is to enable the closing up of the movable head-plate $J'$ upon the head of a can fed between the head-plates, so as to clamp it, and also to enable its withdrawal from the can after the heads are seamed. This endwise movement is rendered possible without ungearing by the great width of the pinion $F'$, as hereinbefore explained. The upper extremity of the toggle-lever $f$ is bifurcated to embrace the head-plate shaft $I'$, and to be inclosed between the rear face of the forward head, $c^\times$, of a yoke, $h$, and a collar, $d^\times$, upon said shaft, as shown in Figs. 1, 2, 3, 5, and 13. This yoke extends backwardly through the right-hand bearing-plate, and ends in a second cross-head, $i$, which is provided with a pivot-pin, $j$, as shown in Fig. 13, which is designed to bear against the end of the head-plate shaft $I'$, so as to enable the setting up of said shaft to secure its accurate adjustment against a given length of can. A similar arrangement may be employed in connection with the shaft $I$ to secure its endwise adjustment. Once adjusted, however, it remains adjusted throughout the operation of the machine.

$k$ is a collar on the shaft $I'$, which serves as an abutment to a coil-spring, $l$, coiled upon the shaft between said collar and the exterior face of the right-hand bearing-plate. The object of this spring is to retain the parts in the position shown in Fig. 1, with the head-plate $J'$ away from the can, and co-operate with the ratchet and toggle releases in placing and retaining them in such position prior to subsequent action of the treadles.

$m$ is a hanger, within which is pivoted a toggle-bar, $n$, connected with a toggle-bar, $o$, the latter of which is connected with the lower extremity of the toggle-lever $f$. At their central point these toggle-bars are connected with a treadle-lever, $p$, passing down to a clamping-treadle, $q$, the fulcrum of which is in a depending hanger, $r$, in which is also fulcrumed the starting-treadle.

It is obvious that when the clamping-treadle is raised in the position shown in Fig. 1 and the toggle-bars crooked, the upper forked extremity of the toggle-lever $f$ is thrown to the right hand, the spring $l$ expanded, and, through the medium of the collars $d^\times$ and $k$, the head-plate $J'$ thrown away from the head of the can.

$s$ is a depending bracket, carrying a stop-screw, $t$, which bears beneath the toggle-bar $o$ and serves to limit its downward movement.

Such being the construction of this clamping mechanism, it is obvious that in starting the machine, which prior to starting is in the position shown in Fig. 1, the clamping-treadle is depressed, whereby the toggle-bars are straightened out, as shown in Fig. 2, the toggle-lever thrown to the left, and the head-plate clamped up against the can. The can being clamped as above, the starting-treadle is next depressed, with the result that the starting-rod is drawn down, the bell-crank deflected, and with the latter the shifter-rod shifted, so as to set the machine in action. As the starting-rod is drawn down to its lowest point the lower extremity of its upper portion, or that extremity which passes below the yoke, Fig. 8, and which is equipped at its lower end with a toggle-release, $e^\times$, is caused to lock said hook or toggle-release over the toggle-pin $f^\times$, which joins the toggle-bars.

The toggle-release is a hook of the form shown in Figs. 1 and 2, and is so constructed that when hooked over the toggle-pin $f^\times$, as shown in Fig. 2, it is held by means of a coil-spring, $g^\times$, in such position. Upon the action of the releasing-ratchet $e$ and the raising of the starting-rod the toggle-release is raised, raising with it the toggle-bars, so as to crook them into the form shown in Fig. 1. When the starting-rod has assumed its highest point, an angularly-projecting ledge, $h^\times$, of the toggle-release encounters a stop, $i^\times$, beneath the frame-work, and is deflected into the position shown in Fig. 1, its spring $g^\times$ being compressed.

In this position, as will be seen and readily understood, the toggle-release is thrown off the toggle-pin and the toggle left in readiness to be straightened by the action of the clamping or toggle treadle.

I have invented certain feeding devices, which are as follows:

$j^\times$ is a skeleton-platform bracketed out from the front of the machine, as well shown in Figs. 3, 4, 5, and 12, which is provided at each of its sides with ways $k^\times$, within which the trunnions $l^\times$ of the slide feed-frame travel.

$m^\times$ is the sliding feed-frame, (shown in perspective in Fig. 6,) which is arranged, as stated, to slide in and out within the skeleton-platform. This frame is, at its forward extremity, provided with a handle, $n^\times$, by which the workman operates it into action, and at its rear extremity it is provided with a gage-rest, $o^\times$, which is so shaped as to receive and hold tightly by means of a little spring, $p^\times$, a can to be fed, as well shown in Figs. 5 and 6. In feeding the machine the slide feed-frame is supposed drawn out by means of its counterpoise until its trunnions are engaged with the forward face of the skeleton-platform, as shown in Fig. 5. A can is then placed upon the gage-rest and the frame pushed by the operator into the machine until stopped by the abutting of its trunnions against adjustable stops $q^\times$, located at the extremities of the ways of the skeleton-platform, and made adjustable to enable the accurate placing of the can.

$r^\times$ is a tilting-pin laterally projecting from the side of the gage-rest $o^\times$, which, as the slide-frame is pushed home, catches over the hooked forward extremity of a pivoted latch, $s^\times$, fulcrumed on the side of the yoke of the starting-rod, as shown in Figs. 8 and 12. The object of this contrivance is to lock the feed-frame in place and prevent the premature action of the counterbalance (whereof hereinafter) from drawing out said frame before the tilting of the latter, after the clamping of the can. After the can is thus fed between the head-plates and the disks are clamped together upon it the starting-treadle is depressed, whereby not only is the machine started, the head-plates being set into rotation, but through the medium of a fixed collar, $t^\times$, upon the starting-rod, Figs. 8 and 12, which, in the downward movement of the latter, encounters the tilting-pin, the sliding feed-frame is tilted about its trunnions, which the passage of the guide-pins $y^\times$ upon the sides of the frame through the notches $z^\times$, Figs. 3 and 6, in the skeleton-platform enables. By the action of the above contrivance the frame is tilted into the position shown in Fig. 4, so as to be clear of the rotation of the can. In the depression of the starting-treadle, when the yoke $y^\times$ and the collar $t^\times$ reach a proper point of downward movement a trip, $u^\times$, upon the frame, Fig. 8, encounters the rear extremity of the latch $s^\times$ and tilts the same into the position shown in Fig. 4, thereby compressing a spiral, $v^\times$, beneath the forward end of the latch and between said forward end and an abutment of the yoke, and thereby releasing the tilting-pin from the gripe of the latch, and enabling a counterbalance-weight, $w^\times$, Fig. 4, connected with the frame by means of a rope passing over suitable pulleys on the frame, to draw forward the frame into the position shown in Fig. 5, in which its gage-rest is in position to receive another can.

A' is an apron, Fig. 4, upon which the seamed and finished can is received as the head-plates are unclamped. This apron acts not only as a cushion to receive the can as it falls from between the disks, but as an inclined plane or chute to deliver the completed can at the rear of the machine.

Having thus described my invention, I claim and desire to secure by Letters Patent of the United States—

1. In a machine for closing the seams which secure the heads to the bodies of quadrangular, square, hexagonal, or other sheet-metal cans not circular or oval, the following instrumentalities in combination: first, a pair of head-plates conformed to the shape of the heads of the can to be closed, and adapted by suitable means together to retain and rotate the can; second, seaming-rolls; third, mechanism whereby the seaming-rolls are retained against the seams of the heads and in close conjunction therewith throughout the entire length of the seams, of whatever outline not circular or oval the seams may be; and, fourth, a feeding mechanism whereby a can is fed between the head-plates, so as to be clamped thereby, substantially as set forth.

2. In a machine of the class above recited, in combination with one of a pair of head-plates capable of having, together with its shaft, an endwise movement, a toggle-lever, toggle, toggle-release, clutch-release, and means for connecting said toggle-release and clutch-release, whereby when the clutch-release is operated the crooking of the toggle and the consequent movement of said head-plate away from its opposite head-plate is effected, so as to unclamp a can previously clamped between said head-plates, substantially as described.

3. In a machine of the class above recited, in combination with a starting device, a clutch which sets in action the driving-pulley, an eccentric which tightens up the seaming-rolls against the seam to be closed, a ratchet-release which releases the clutch at a given time, a head-plate stop which sets free the head-plates, a depressing collar and latch which combine to lock the feed-frame into position to permit of the clamping of the can and to tilt it clear of the path of the can when rotated, a toggle-release which engages the straightened toggle-bars to effect their subsequent crooking, and means for connecting said several instrumentalities with said starting device, substantially as set forth.

4. In a machine of the class above recited, in combination with a releasing device, such as a ratchet-release, a clutch which sets free the driving-pulley, a head-plate stop which locks the head-plate in a given position to properly receive the can, an eccentric which loosens the seaming-rolls from the completed seam, a toggle-release which crooks a clamping-toggle and by means of a toggle-lever and head-plate shaft moves the movable head-plate endwise away from its opposite head-plate, so as to unclamp and free a can previously clamped between said head-plates, and means for connecting said several instrumentalities with said releasing device, substantially as set forth.

5. In a machine of the class above recited, in combination with a starting device, an eccentric-shaft which tightens the seaming-rolls against the seam to be closed, and means for connecting the same, substantially as and for the purpose set forth.

6. In a machine of the class above recited, in combination with a starting device, a head-plate stop adapted to be thrown out of action thereby, so as to set free the head-plates, and means for connecting the same, substantially as and for the purpose set forth.

7. In a machine of the class above recited, in combination with a starting-rod and with a tilting feed-frame, a depressing-collar on said starting-rod which encounters and tilts said feed-frame clear of the path of the can when rotated, substantially as and for the purpose set forth.

8. In a machine of the class above recited, in combination with a starting device, a toggle-release affixed thereto, which upon the downward movement of said starting device engages with the toggle-bars, substantially as and for the purpose set forth.

9. In a machine of the class above recited, in combination with a starting device provided with a latch-tilting collar, a latch or lock, a tilting feed-frame, and a latch-trip, whereby the locking of the feed-frame in place between the head-plates, its subsequent tilting, and final release are effected, substantially as and for the purpose specified.

10. In a machine of the class above recited, in combination with a pair of rotary head-plates, a releasing device, a head-plate stop, and means for connecting the same, the arrangement being such that the stop by the action of said release is brought into contact with one of the head-plates, so as to stop the movement of the head-plates in proper position to receive the can, substantially as described.

11. In a machine of the class above recited, in combination with pivotally-mounted seaming-rolls, a releasing device, an eccentric-shaft, and means for connecting the same, the arrangement being such that the eccentric-shaft, by the action of said release, loosens the seaming-rolls from the completed seam, substantially as set forth.

12. In a machine of the class above recited, the combination of a sliding feed-frame provided with trunnions, as set forth, with a skeleton-platform in which said trunnions reciprocate, the arrangement being such that the feed-frame can be both reciprocated in and out of the machine and tilted upon its trunnions, substantially as and for the purpose set forth.

13. In a machine of the class above recited, the combination of a sliding feed-frame supported by and traveling in a suitable framework, a counterpoise-weight, a latch, a starting-rod provided with a latch-tilting collar, and a latch-trip, the arrangement being such that the descent of the starting-rod trips the latch and enables the counterpoise-weight to replace the frame in position to receive a second can, substantially as shown and described.

14. In a machine of the class above described, in combination with a sliding feed-frame provided with a counterpoise-weight and operating as described, a latch, $s^x$, collar $t^x$, and spring $v^x$, as a device designed to lock the feed-frame against the action of its counterpoise-weight during the time preceding the clamping of the head-plates upon the can and the starting of the machine, substantially as and for the purpose set forth.

15. In a machine of the class above recited, as a device for locking the sliding feed-frame in the manner hereinbefore described and then unlocking it, the locking-latch $s^x$, in combination with the starting-rod, the trip $u^x$, tilting-pin $r^x$, collar $t^x$, and spring $v^x$, substantially as and for the purpose set forth.

In testimony whereof I have hereunto signed my name this 8th day of December, A. D. 1880.

GEORGE H. PERKINS.

In presence of—
J. BONSALL TAYLOR,
C. B. TAYLOR.